United States Patent [19]

Burns

[11] 4,061,595

[45] Dec. 6, 1977

[54] PRODUCTION OF SULFUR RECOVERY CATALYST FROM BAUXITE FINES

[75] Inventor: Robert A. Burns, Long Valley, N.J.

[73] Assignee: Engelhard Minerals & Chemicals Corporation, Edison, N.J.

[21] Appl. No.: 666,795

[22] Filed: Mar. 15, 1976

[51] Int. Cl.² ............................................. B01J 23/08
[52] U.S. Cl. .................................................... 252/463
[58] Field of Search ......................................... 252/463

[56] References Cited

U.S. PATENT DOCUMENTS

| | | | |
|---|---|---|---|
| 2,662,860 | 12/1953 | Engel et al. ....................... | 252/463 X |
| 2,952,644 | 9/1960 | Holden ............................. | 252/463 X |
| 3,105,053 | 9/1963 | Cramer et al. .................... | 252/463 X |
| 3,222,297 | 12/1965 | Allegrini et al. ................ | 252/463 X |
| 3,322,666 | 5/1967 | Beuther et al. .................. | 252/463 X |
| 3,340,205 | 9/1967 | Hayes et al. ...................... | 252/463 X |
| 3,925,257 | 12/1975 | Horzepa et al. .................... | 252/463 |
| 3,928,239 | 12/1975 | Yonehara et al. ................ | 252/463 X |

*Primary Examiner*—Winston A. Douglas
*Assistant Examiner*—John F. Niebling
*Attorney, Agent, or Firm*—Inez L. Moselle

[57] ABSTRACT

Bauxite fines, preferably uncalcined, are mixed with an acid anion-containing alumina hydrosol having an aluminum/acid anion ratio in the range of from about 0.5:1 to about 2:1. The mixture is formed into particles by extrusion and then dried and calcined.

6 Claims, No Drawings

PRODUCTION OF SULFUR RECOVERY CATALYST FROM BAUXITE FINES

BACKGROUND OF THE INVENTION

1. Field of the Invention

This invention relates to the treatment of ground bauxite ore to produce mechanical particles which possess the activity and mechanical strength required for use as a catalyst, especially the catalyst employed in the known Claus process for producing sulfur from hydrogen sulfide gas. In particular, the invention relates to a process for binding particulate bauxite ore with a specific type of colloidal alumina to produce a pelleted sulfur recovery catalyst.

2. Prior Art

U.S. Pat. No. 3,925,257 to Horzepa et al, which is assigned to the assignee of this application, describes a method for pelletizing ground bauxite ore with a specific type of colloidal alumina, namely colloidal boehmite alumina such as is marketed under the tradenames "Dispal ®" and "Catapal ®." The process involves mixing a small amount of the colloidal alumina in dry powdered form with dry calcined bauxite fines, adding acid such as hydrochloric to peptize the colloidal alumina, extruding to form pellets, drying and calcining. Included in the specification of the patent of Horzepa et al under "Field of the Invention" is a summary of the history of attempts to produce pelleted bauxite products suitable for use as a sulfur recovery catalyst. Problems encountered in attempting to adapt well-known colloidal alumina binders to the production of a pelletized bauxite product are discussed. Included in the prior art cited in the Horzepa et al patent is U.S. Pat. No. 2,662,860 to Engel et al. The latter patent describes a process for producing an activated alumina bonded product, suitable for use as a sulfur recovery catalyst, by mixing ground uncalcined bauxite ore with aluminum chloride or aluminum sulfate and water, heating to liberate water and hydrolyze the salt, followed by calcination to produce a product having disclosed utility as a catalyst in the Claus process. Disclosures in the Horzepa et al patent as to the prior art are incorporated herein by reference.

The process of the Horzepa et al patent has resulted in a product meeting the criteria (activity, hardness, etc.) of a catalyst for the Claus process without creating a pollution problem during manufacture or leaving undesirable residues in the product. Production costs, however, leave something to be desired. The starting bauxite ore must be calcined twice, once before it is mixed with alumina such as "Catapal" and again after the green pellets have been prepared. Furthermore, the cost of the binder adds appreciably to the manufacturing costs even though small amounts of binder are required. It was found that binding costs could be reduced significantly and manufacturing expenses further decreased by using aluminum chloride with uncalcined ground bauxite ore substantially as described in the patent of Engel et al. However, a pollution problem of potentially serious magnitude was encountered because of the large quantities of hydrochloric acid that volatilized when the extruded pellets were calcined to activate and harden the product.

THE INVENTION

In essence the instant invention represents an improvement over both the process of Horzepa et al and that of Engel et al. Thus, a principal objective is to produce an alumina-bonded catalyst at a cost significantly less than required when practicing the invention of Horzepa et al while minimizing pollution problems that are encountered when using hydrolyzable aluminum salts such as employed by Engel et al for binding the ground ore.

Briefly, the subject invention involves binding ground bauxite ore, calcined or uncalcined, preferably uncalcined, with a small amount of an acid-anion containing alumina hydrosol having an aluminum/acid anion ratio in the range of about 0.5:1 to 1.5:1, preferably about 0.6:1 to 1.0:1, when using uncalcined ore and in the range of about 0.5:1 to 2:1, preferably 1.5:1 to 2:1, when using calcined ore. In practicing the invention, ground bauxite ore is mixed with hydrosol and water, if needed, to form a plastic mixture which is formed into particles, preferably by extrusion, to form pellets. The particles are dried and then activated (calcined).

The hydrosols employed in practice of my invention are known. They are prepared by hydrolyzing a suitable acid salt of aluminum, such as the chloride, sulfate, nitrate, acetate or formate, and reducing the anion concentration by neutralization, by various means, preferably by means of aluminum metal. When aluminum metal is used for neutralization, the salt of neutralization metal is an aluminum salt which hydrolyzes and ultimately forms a sol. Using aluminum acetate or formate which form volatile acids, the desired reduction in acid-anion concentration can be achieved by heating a solution of the salt under conditions controlled to realize the desired extent of anion concentration reduction. Reduction in anion concentration by either method results in the formation of an inorganic colloidally dimensioned alumina polymer which is essentially stably suspended in the mother liquor. Procedures for the manufacture of anion-containing alumina hydrosols are described in the following patents: U.S. Pat. No. 2,196,016 to Huehn; U.S. Pat. No. 3,870,545 to Tabacek et al and U.S. Pat. No. 3,923,646 to Hilfnan.

Use of an acid anion-deficient alumina hydrosol in accordance with this invention permits effective binding of ground bauxite ore, even uncalcined ore, at a remarkably low cost as compared with the cost of using acid-peptized commercial aluminas such as "Catapal" or "Dispal" since significantly less binder is required. Emission of pollutants during manufacture is appreciably less than experienced using the aluminum chloride of the prior art. For example, pelleted catalysts having desired hardness were produced from uncalcined ore using about 0.08 tons of the binder of the invention (anhydrous basis) per ton of catalyst. About 70% more binder was required using acid-peptized "Catapal SB" and calcined ore was required to produce hard pellets. Binder cost was reduced by about ⅔ when 0.08 tons of binder of the invention having an Al/Cl ratio of 1:1 was used for each ton of catalyst product. Hydrochloric evolution was as low as 24 pounds HCl per ton of catalyst (using a hydrosol with a Al/Cl ratio of about 1:1. ) About 64 pounds of HCl was evolved using aluminum chloride at a lower binder level (0.036 lbs./ton) with the same uncalcined ores. When a binder with a more highly reduced anion concentration (Al/Cl ratio of 2/1) was employed with calcined ore, only about 11 pounds of HCl was volatized per ton of catalyst when the binder was employed at the level of 0.07 tons (anhydrous basis) per ton of catalyst.

DESCRIPTION OF PREFERRED EMBODIMENTS

Preferred acid-anion containing alumina hydrosols are aluminum chloride hydrosols sometimes referred to as aluminum oxychloride hydrosols or aluminum hydroxy-chloride hydrosols. These hydrosols may be prepared by the process of U.S. 2,196,016 (supra). Typically, they are produced as solutions of about 30 to 35% (wt.) concentration by reacting aluminum with a solution of aluminum chloride ($AlCl_3$) of about 33% concentration at elevated temperatures below the boiling point. Sufficient aluminum is used to reduce the anion concentration in the solution to a desired level. Alternatively the aluminum chloride hydrosols can be prepared by reacting aluminum metal with hydrochloric acid and adding additional aluminum metal to the resulting solution of aluminum chloride.

Following are typical compositions of suitable aluminum chloride hydrosols.

| Al/Cl | Concentration, wt. % | Wt. % $Al_2O_3$ | Wt. % Cl |
|---|---|---|---|
| 0.66/1 | 34.0 | 16.4 | 17.1 |
| 1.0/1 | 33.4 | 19.5 | 13.6 |
| 2.0/1 | 32.6 | 24.0 | 8.4 |

Another preferred group of hydrosols are the aluminum acetate hydrosols which can be prepared by reacting a predetermined proportion of aluminum metal with a solution of aluminum acetate ($Al(Ac)_3$) or by heating a solution of aluminum acetate to reduce anion concentration by volatilization of acetic acid.

Aluminum sulfate hydrosols may also be employed and are attractive from the emissions standpoint because aluminum sulfate decomposes at a higher temperature (about 1400° F.) than the temperatures used to activate the catalyst product (typically 750° F.). However, the sulfate residue in the activated product may be undesirable in some catalytic applications. Aluminum nitrate hydrosols with reduced anion content can be used but they are not preferred because of the problem of coping with nitrate emissions and corrosion difficulties.

The bauxite ore used in carrying out the invention should be a gibbsitic ore, i.e., an ore containing appreciable alpha alumina trihydrate. Such ores are mined in South and North America as well as South Africa. Analyses of typical gibbsite ores appear in "MINERALS FOR THE CHEMICAL AND ALLIED INDUSTRIES," S. J. Johnstone and M. G. Johnstone, Second Edition, page 6, published by John Wiley & Sons, Inc. (1961).

Either calcined or uncalcined ore may be utilized when the aluminum salt hydrosols have aluminum to acid-anion ratios in the range of about 0.5:1 to 1.5:1. In other words, hydrosols which have relatively moderately reduced anion concentrations are useful with both forms of ore. However, when employing hydrosols that are highly reduced in anion concentration, for example hydrosols having an aluminum to anion ratio appreciably about 1.5:1, e.g., 2:1, it will be necessary to use calcined ore since catalyst products having sufficient strength cannot be prepared at reasonably low hydrosol binder levels from uncalcined ore when the hydrosols have very low anion concentrations. Hydrosols with aluminum to anion ratios in the range of about 0.6:1 to 1:1 are preferred when using uncalcined ore since hydrosols with higher metal/anion ratios may not produce bonds of sufficient strength. Ratios in the range of about 1.5:1 to 2:1 are preferred when the ore is calcined. In either case, it is preferable to use a hydrosol having a highest aluminum to anion ratio that will produce hard pellets at a desired binder level.

Relatively small quantities of acid anion-containing alumina hydrosols are required to produce catalyst pellets of desired hardness. Generally less than 200 pounds of hydrosol (anhydrous basis) is required to produce a ton of finished catalyst. In most cases the hydrosol is employed in amount within the range of 130 to 200 pounds per ton catalyst (anhydrous basis). In other words, when employing a typical hydrosol of 33% concentration, about 350 to 700 pounds of hydrosol is used to produce a ton of product. Generally somewhat smaller quantities of binder are required when using calcined ore. Sufficient hydrosol is employed to produce a calcined product of acceptable strength which should be adequate to permit use of pneumatic handling equipment in a sulfur recovery plant. A minimum quantity required to produce acceptable strength is used to minimize emissions during activation and because of raw material cost considerations. Simple routine tests will suffice to determine a satisfactory level for commercial practice.

Calcined ore may be provided by heating raw ore at a temperature in the range of about 500° F. to 1000° F. until the volatile matter (V.M.) is in the range of about 5% to 15% by weight. The term "volatile matter" is described in U.S. Pat. No. 3,406,125 to Allegrini et al.

The starting ore should be in the form of fines, i.e., particles 30 mesh (Tyler) or finer, for example minus 325 mesh. The fines are produced by grinding and sizing whole ore. When using precalcined ore, grinding may be prior or subsequent to calcination. Preferably, the ore is put into the form of fines before calcination because of reduced wear on grinding equipment when uncalcined ore is being handled. It is within the scope of the invention, however, to calcine crushed ore and then grind the ore to produce the calcined fines.

The anion-containing alumina hydrosol can be mixed with the ground bauxite ore in any equipment capable of intimately mixing a pasty heavy mixture. A pug mill or a muller will suffice. In some cases, additional water must be added to produce a mixture of plastic consistency. This will depend upon the amount of hyrosol used and whether calcined or uncalcined ore is employed. Also, it will depend on the particle size of the ground ore, the physical nature of the ore and the method of pelletizing.

Mixing and forming may be carried out in an auger extruder provided with suitable outlets at the discharge end. Recommended is an extruder of the pin barrel type such as described in the patent of Horzepa et al.

Typical pellets are about 3/16 inch to 8/16 inch in diameter. After extrusion these pellets can be cut to suitable length, e.g., 1/16 inch to 5/16 inch.

The pellets can be dried in a directly or indirectly heated oven or drier at about 250° F. to 375° F. for a time within the range of about 15 minutes to 2 hours followed by calcination at a temperature in the range of about 500° F. to 800° F., preferably at about 600° F. to 750° F. Typical V.M. of the calcined pellets is in the range of 5% to 12%.

The catalyst products preferably have a hardness value, when tested by the so-called "4-ball" test method, of at least 90% when employing 5/16 inch pellets. The 4-ball test method is described in U.S. Pat. No. 3,078,518 to Robinson and Haden. Crush strength should exceed 45 pounds (for 5/16 inch pellets) when measured by an Instron Testor (Model TM) fitted with a CCT Compression Cell. A crushing speed (crosshead speed) of 0.05 in./min. is used to measure the crush strength of 5/16 inch diameter pellets. Strength is measured perpendicular to the longitudinal axis of the individual pellets. Pellets about 5/16 inch in length are selected for testing. The average result for at least ten specimens is reported.

In tests carried out in accordance with this invention, catalyst pellets suitable for use in the Claus process were produced by binding uncalcined Surinam bauxite ore, ground to minus 325 mesh, with aluminum chloride hydrosols having aluminum to chloride ratios in the range of 0.66:1 and 1.0:1. The compositions of these hydrosols in reported hereinabove as being representative of suitable hydrosols of this type.

Pellets having a 5/16 inch diameter were prepared by mixing the hydrosol with the ground bauxite ore in a Sigma blade mixer for 30 minutes. Water was added to obtain an extrudable consistency. Extrusions were performed using a ram-type extruder. Extrusions were performed at approximately 3 tons ram pressure by adjusting the moisture content of the batch. Extruded products were dried for 2 hours at 350° F. followed by activation at 750° F. for 1 hour.

Pellets with crush strengths of 45 pounds and above and Ball Mill hardness of 90% or above (for 5/16 inch pellets) were produced when a hydrosol with a 0.66:1 Al/Cl ratio was utilized in amount in the range of 130 to 155 pounds per ton of bauxite ore and when a hydrosol with a 1.0:1 Al/Cl ratio was employed in amounts in the range of 115 pounds to 130 pounds per ton of bauxite ore.

Similar tests were carried out on a hydrosol having a Al/Cl of 2.0:1 and a concentration of 32.6%. When using this hydrosol, pellets of desired mechanical strength could not be produced when the hydrosols were used at levels of addition that resulted in pellets of acceptable hardness when hydrosols having a higher anion concentration were used. By substituting activated bauxite ore, strength was increased but the pellets were not so hard as pellets produced with unactivated ore and the same amounts of hydrosols having Al/Cl ratios of 0.66:1 and 1.0:1.

All of the pellets produced with the aluminum chloride hydrosols having reduced anion concentrations evolved less hydrochloric acid during activation than did pellets prepared using aluminum chloride binder.

I claim:

1. A method for making ground particles of calcined or uncalcined bauxite ore into larger mechanically strong catalyst pellets which comprises thoroughly mixing said ground particles with an acid-anion containing alumina hydrosol and sufficient water to provide an extrudable mass, said hydrosol having an aluminum/acid-anion ratio in the range of about 0.5 to 2:1 when using calcined ore and in the range of about 0.5 to 1.5:1 when using uncalcined ore, said hydrosol being used in amount of 130 to 200 pounds, on an anhydrous weight basis, per ton of pellets, anhydrous weight basis, extruding said mass into pellets, and drying and calcining said pellets.

2. The process of claim 1 wherein the acid-anion is selected from the group consisting of chloride, nitrate, sulfate, acetate and formate.

3. The process of claim 1 wherein the acid-anion is chloride.

4. A process for making a pelleted sulfur recovery catalyst having mechanical strength which comprises mixing ground particles of uncalcined bauxite ore, said particles being finer than 30 mesh (Tyler), with a minor weight percentage of an alumina hydrosol and water sufficient to form an extrudable mass, said hydrosol having been prepared by reacting aluminum metal with a solution of aluminum chloride and having a ratio of aluminum to chloride in the range of about 0.5:1 to 1.5:1, thoroughly pugging said mass, extruding said mass to form pellets having a diameter in the range of about 3/16 inch to 8/16 inch, and calcining the pellets at a temperature in the range of from 500° F. to 800° F., said hydrosol being used in amount of 130 to 200 pounds, on a volatile-free weight basis, per ton of calcined pellets.

5. The process of claim 4 wherein the hydrosol has an aluminum to chloride ratio in the range of about 0.66:1 to 1.0:1.

6. Catalyst pellets made by the process of claim 1.

* * * * *